(12) United States Patent
Kazmier (10) Patent No.: US 9,301,021 B2
(45) Date of Patent: Mar. 29, 2016

(54) WORKFLOW OPTIMIZATION IN PREPARING C3 BROADCAST CONTENT FOR DYNAMIC ADVERTISING

(71) Applicant: Vubiquity, Inc., Reston, VA (US)

(72) Inventor: Michael S. Kazmier, Kalispell, MT (US)

(73) Assignee: VUBIQUITY, INC., Reston, VA (US)

( * ) Notice: Subject to any disclaimer, the term of this patent is extended or adjusted under 35 U.S.C. 154(b) by 0 days.

(21) Appl. No.: 13/924,134

(22) Filed: Jun. 21, 2013

(65) Prior Publication Data

US 2013/0347034 A1    Dec. 26, 2013

Related U.S. Application Data

(60) Provisional application No. 61/663,332, filed on Jun. 22, 2012.

(51) Int. Cl.
| | | |
|---|---|---|
| *H04N 7/16* | (2011.01) | |
| *H04N 21/81* | (2011.01) | |
| *H04N 21/2343* | (2011.01) | |
| *H04N 21/234* | (2011.01) | |
| *H04N 21/231* | (2011.01) | |
| *H04N 21/236* | (2011.01) | |

(52) U.S. Cl.
CPC ....... *H04N 21/812* (2013.01); *H04N 21/23109* (2013.01); *H04N 21/23418* (2013.01); *H04N 21/23439* (2013.01); *H04N 21/23605* (2013.01)

(58) Field of Classification Search
CPC .................. H04N 21/23109; H04N 21/23418; H04N 21/23439
USPC .......................................... 725/144, 145, 146
See application file for complete search history.

(56) References Cited

U.S. PATENT DOCUMENTS

| | | | |
|---|---|---|---|
| 6,408,301 B1 * | 6/2002 | Patton et al. ................... | 707/741 |
| 8,443,383 B2 * | 5/2013 | Carlucci et al. ................. | 725/32 |
| 8,621,044 B2 * | 12/2013 | Sood et al. ..................... | 709/219 |
| 2003/0061612 A1 * | 3/2003 | Lee et al. ......................... | 725/61 |

* cited by examiner

*Primary Examiner* — Dominic D Saltarelli
(74) *Attorney, Agent, or Firm* — Smith, Gambrell & Russell, LLP (57) ABSTRACT

The present invention provides a technique by which content can be prepared for VOD that is quicker than existing techniques. For example, a method of preparing content for distribution comprises recording a video, audio, or video and audio program stream in a plurality of chunks, each chunk including a discrete portion of the recorded program stream, processing the program stream so as to mark locations, in parallel, encoding each recorded chunk to a plurality of output formats, wherein the encoding is started after at least one chunk is recorded but before all chunks of the program are recorded, for each of the plurality of output formats, in parallel, modifying the recorded and encoded chunks which correspond to locations that have been marked in the program stream and re-encoding the modified chunks; and for each of the plurality of output formats, concatenating the encoded and re-encoded chunks to form an output program in each of the plurality of output formats.

16 Claims, 5 Drawing Sheets

WORKFLOW OPTIMIZATION IN PREPARING C3 BROADCAST CONTENT FOR DYNAMIC ADVERTISING

CROSS-REFERENCE TO RELATED APPLICATIONS

This application claims the benefit of Provisional Application No. 61/663,332, filed Jun. 22, 2012, the contents of which are incorporated herein in their entirety.

BACKGROUND OF THE INVENTION

1. Field of the Invention

The present invention relates to preparing live (realtime) video, audio, or video and audio program content for distribution via time-shifted/on-demand methods.

2. Description of the Related Art

Video on demand (VOD) systems allow users to select and watch/listen to video or audio content at any time the user desires. Television VOD systems deliver content, either by streaming or by download, through a set-top box, a computer, or other device. Although, in the past, VOD content has mainly included pre-existing content, VOD delivery of live content has become increasingly popular. However, before the content can be delivered, it must be processed for delivery. Such processing may include compression and encoding of the content. Additional processing may include preparation for Dynamic Advertising, Editing, Quality Analysis, Fingerprinting, and more. For Dynamic Advertising such processing includes digitally marking the original advertisements from the content, conditioning the stream, and adding the capability to select and deliver alternate advertisements during delivery of the content to the user.

A problem arises in that the time required to process live content for VOD, including preparation for Dynamic Advertising, can be quite long, often taking as much as 6 hours. This can be a serious problem due to the nature of the business of television broadcasting. In the world of television broadcasting, C3 refers to the 3 day period of time from when a program is first broadcast. During the C3 period, the broadcaster receives "credit" for every advertising "view" by a consumer, regardless of the medium: Live, VOD or DVR. Because of the time sensitivity and its impact on revenue potential for an asset, it is very important to quickly get a live program captured and prepared for VOD applications.

Figure 1:
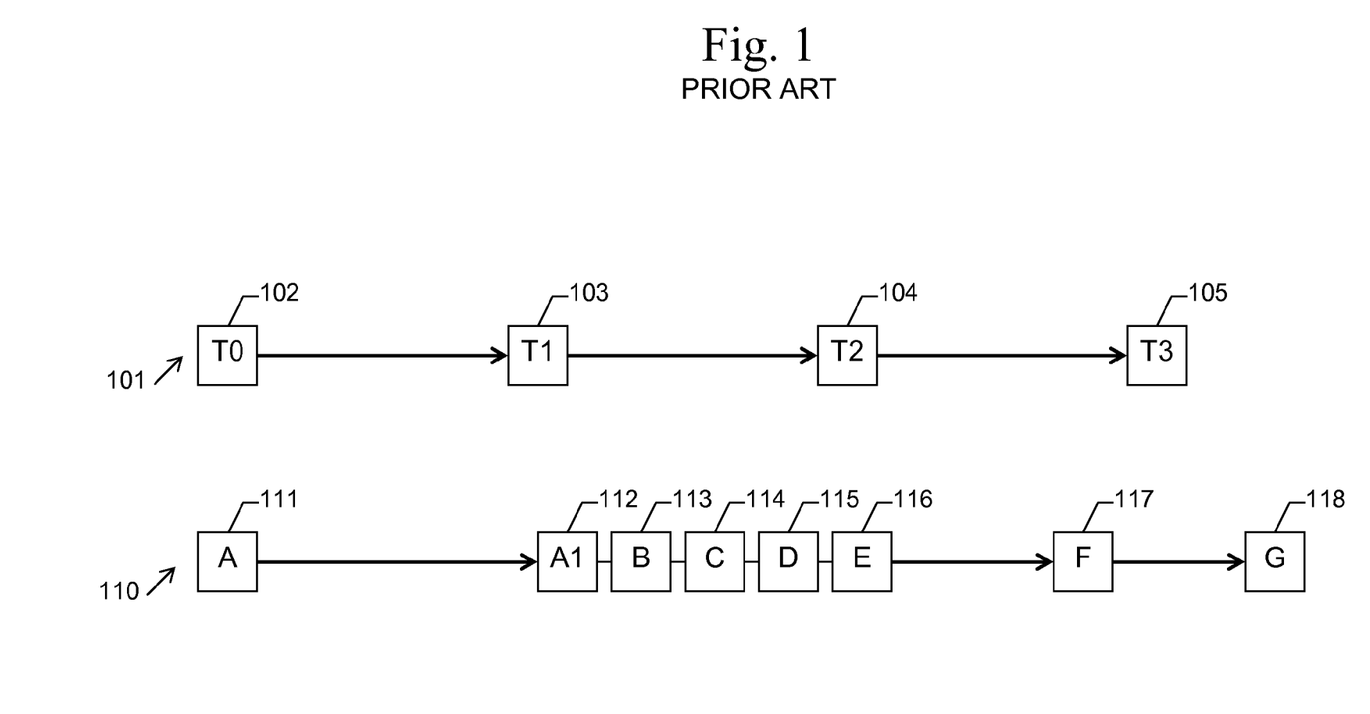
FIG. 1 is an exemplary block diagram of a prior art VOD preparation process.

An exemplary block diagram of a prior art VOD preparation process is shown in FIG. 1. The live video/audio stream 101 includes a number of programs, such as the program that starts at T0 102 and ends at T1 103, the program that starts at T1 103 and ends at T2 104, and the program that starts at T2 104 and ends at T3 105. The process 110 of preparing the program that starts at T0 102 and ends at T1 103 includes block A 111, capturing the video/audio stream. Block A1 112 is performed once the program being captured ends, and includes identifying the start and end of the program of interest and editing the captured video/audio to include only the program. In block B 113, thumbnail images of the program are generated for use in ad splice marking. Likewise, in block C 114, a black frame index of the program is generated, also for use in ad splice marking. In block D 115, an operator places ad splice marks around the individual advertisements and/or the contiguous ad segments (ad pods). In block E 116, the marked content is encoded into one or more distribution formats, such as MPEG2 SD, MPEG2 HD, MPEG4 SD, MPEG4 HD, H.264 ABR, H.265, etc. In block F 117, a Quality Control process verifies the encoded content, and in block G 118, the encoded content is distributed. Each of these processing blocks must be performed serially, as the input to each block requires the output from the previous block. In practice, for a one hour live program, it can take up to six hours for process 110 to prepare the encoded content for distribution. A need arises for a technique by which content can be prepared for VOD that is quicker than existing techniques.

SUMMARY OF THE INVENTION

The present invention provides a technique by which content can be prepared for VOD that is quicker than existing techniques. For example, a method of preparing content for distribution comprises recording a video, audio, or video and audio program stream in a plurality of chunks, each chunk including a discrete portion of the recorded program stream (typically measured in a plurality of seconds), with the frames (audio and video) embedded within each chunk containing the same time stamping, and encoding each recorded chunk to an output format (an encoded variant). An operator will then process all variant encoded streams by performing the necessary tasks (marking, analysis, quality control screening) on the original stream as it is captured from live broadcast (the live stream acts as a proxy for the underlying variants), and the method then processes each recorded chunk so as to mark locations in at least some of the recorded chunks, wherein the encoding and processing is started after at least one chunk is recorded but before all chunks of the program are recorded, and after all of the chunks of the program are recorded and encoded, modifying the recorded and encoded chunks in which locations have been marked and re-encoding the modified chunks if necessary, and then concatenating the encoded and re-encoded chunks to form an single output program per the encoded variant.

In another example, a system for preparing content for distribution comprises a processing system comprising a processor, memory, and computer program instructions configured to record a video, audio, or video and audio program stream in a plurality of chunks, each chunk including a discrete portion of the recorded program stream, distribute each recorded chunk to a plurality of chunk processing subsystems, and transmit requests to each of the plurality of chunk processing subsystems based on operator input indicating locations that have been marked in at least some of the recorded chunks. The system for preparing content for distribution further comprises a plurality of chunk processing subsystems, each chunk processing subsystem comprising a processor, memory, and computer program instructions configured to in parallel with the other chunk processing subsystems, encode each recorded chunk to a plurality of output formats, modifying the recorded and encoded chunks in which locations have been marked and re-encoding the modified chunks, in response to receiving the requests from the processing system indicating locations that have been marked in at least some of the recorded chunks, and concatenating the encoded and re-encoded chunks to form an output program.

In another example, each recorded chunk or encoded variant is made in realtime with identical frame timings, and the marking and editing (tip/tail of the program) is done once on the source stream, and then that information is fed to each subsystem and just the affected chunks are processed with the new information. The processing each recorded chunk so as to mark locations may comprise generating thumbnail images of each recorded chunk, displaying the thumbnail images to an operator, receiving input from the operator indicating at least one of a start of the program, an end of the program, or a location of an advertisement in the program. The modifying the recorded chunks may comprise at least one of deleting information before the indicated start of the program, deleting information after the indicated end of the program, or aligning a mark indicating each advertisement to the same frame in every variant stream (typically to an I/IDR frame). The output format may include at least one encoded variant of MPEG2 SD, MPEG2 HD, MPEG4 SD, MPEG4 HD, H.264 ABR, or H.265.

BRIEF DESCRIPTION OF THE DRAWINGS

The details of the present invention, both as to its structure and operation, can best be understood by referring to the accompanying drawings, in which like reference numbers and designations refer to like elements.

DETAILED DESCRIPTION OF THE INVENTION

The present invention provides a technique by which content can be prepared for VOD that is quicker than existing techniques. These new techniques perform the capturing and recording of the original video, audio, or video and audio (video/audio) source program, encoding of that recorded program into one or more output formats (encoded variants), and the marking and editing (preparation) of each encoded variant, and performing said functions in a single realtime process. This greatly reduces the processing time from the conventional 6 hour workflow by moving the three most time consuming tasks into one real-time process that is executed as the content is being captured.

Figure 2:
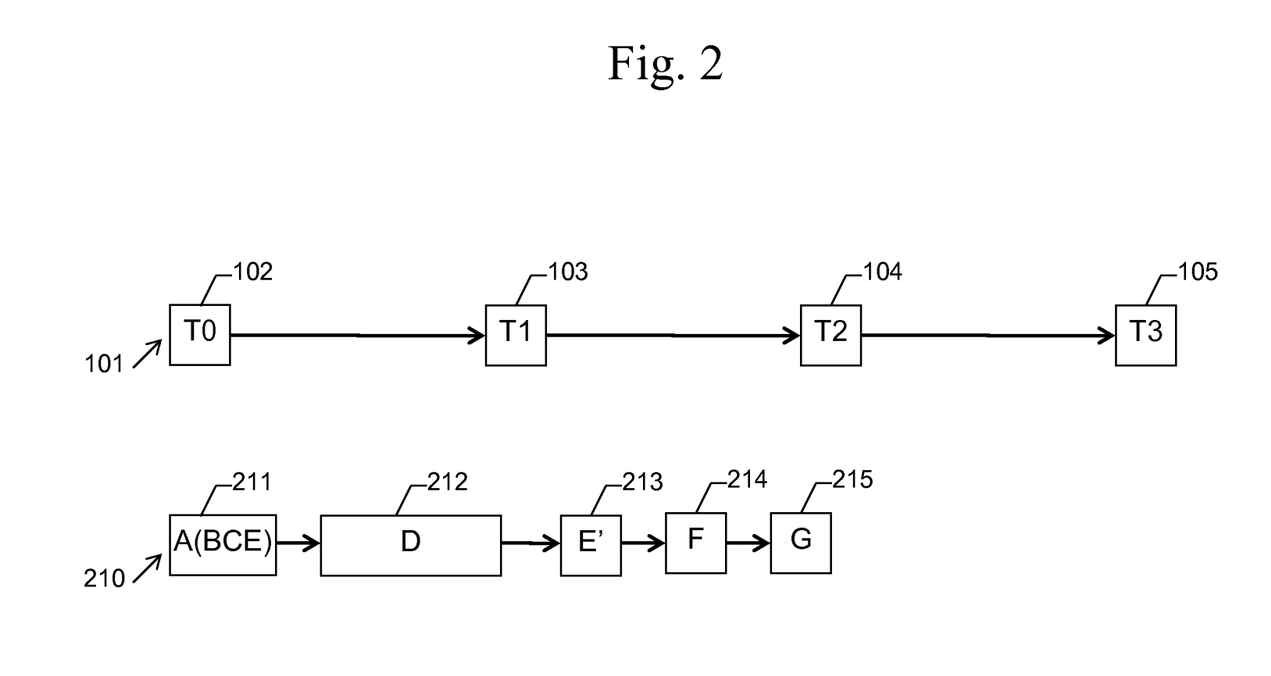
FIG. 2 is an exemplary block diagram of a conventional banked CAM.
Figure 3:
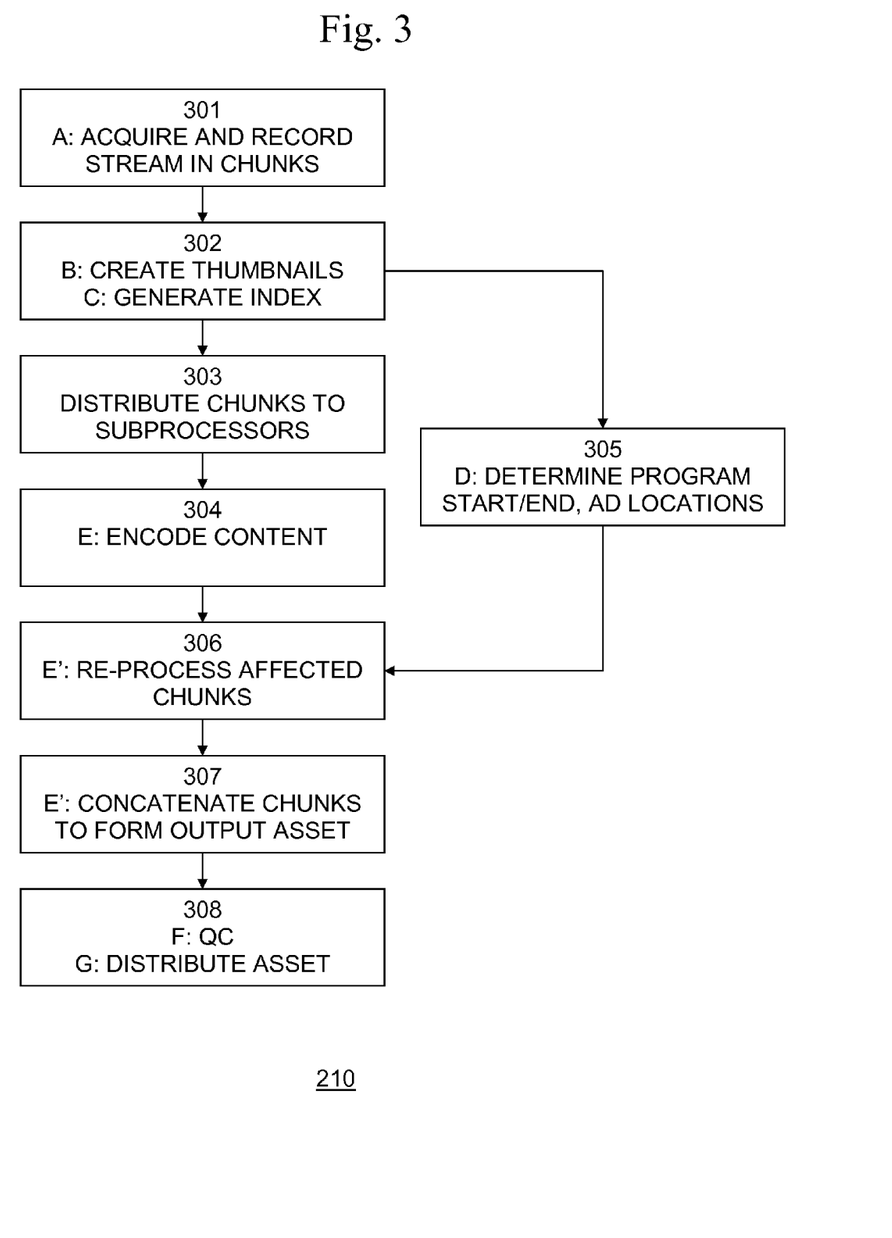
FIG. 3 is an exemplary flow diagram of VOD preparation process.
Figure 4:
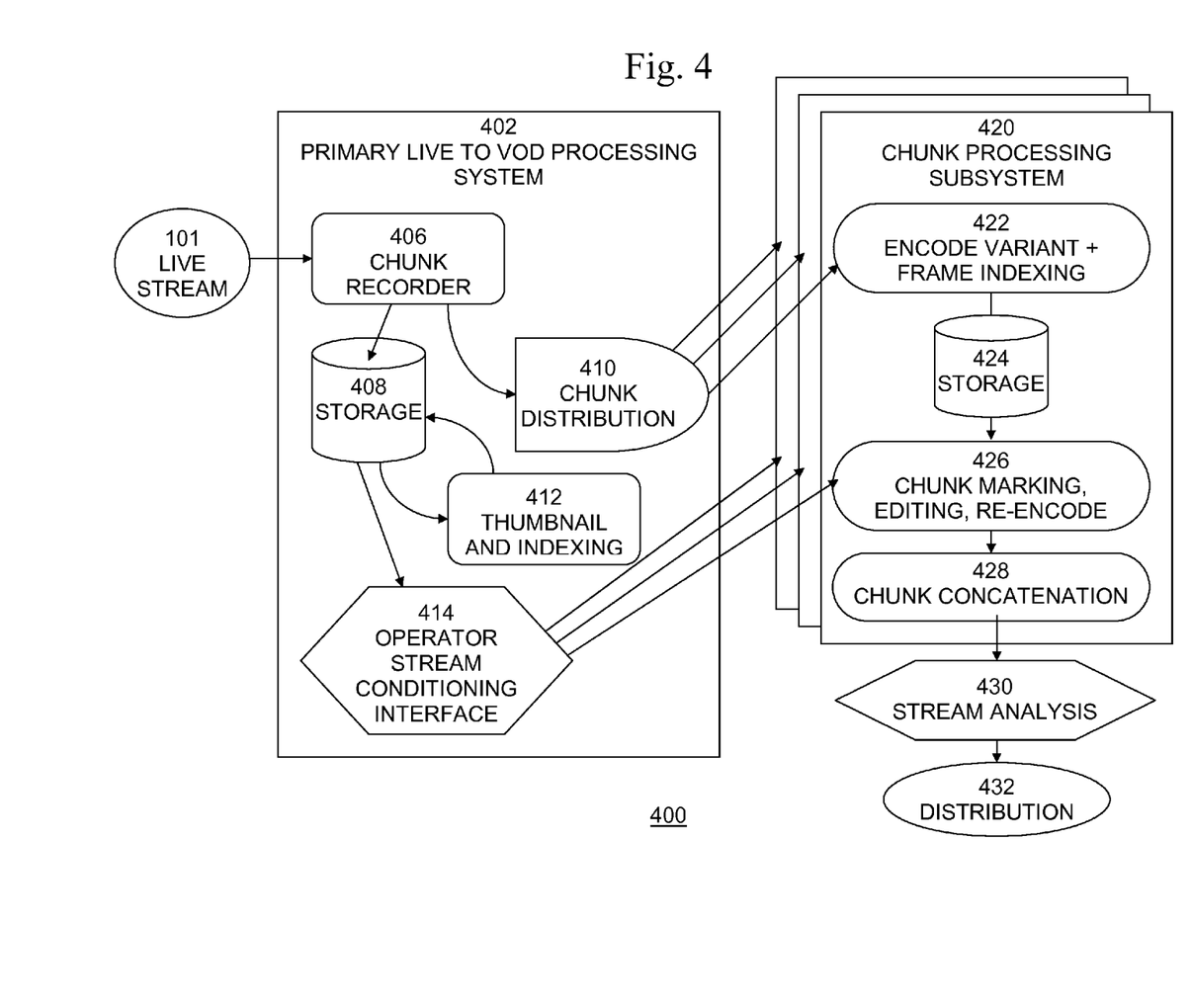
FIG. 4 is an exemplary block diagram of a VOD preparation processing system.

An exemplary block diagram of a novel VOD preparation process according to the present invention is shown in FIG. 2. It is best viewed in conjunction with FIG. 3, which is a flow diagram of VOD preparation process 210, and FIG. 4, which is an exemplary block diagram of a VOD preparation processing system 400. Referring briefly to FIG. 4, system 400 includes primarily live to VOD processing system 402, and, for each system 402, a plurality of chunk processing subsystems 420. System 402 includes chunk recorder 406, storage 408, chunk distribution block 410, thumbnail and indexing block 412, and operator stream conditioning interface 414. Each of the plurality of chunk processing subsystems 420 includes encode variant and frame indexing block 422, storage 424, chunk marking, editing, and re-encoding block 426, and chunk concatenation block 428. The functions of these systems, and the remaining elements shown in FIG. 4 are described below, in conjunction with the descriptions of FIGS. 2 and 3.

The live video/audio source stream 101 includes a number of programs (a "program" here is defined as a segment of content as contained within two temporal boundaries), such as the program that starts at T0 102 and ends at T1 103, the program that starts at T1 103 and ends at T2 104, and the program that starts at T2 104 and ends at T3 105. Live stream 101 is input to VOD processing system 402. The process 210 of preparing the program that starts at T0 102 and ends at T1 103 begins with step 301, item A of block 211, in which the source program video/audio stream is acquired and recorded into discrete chunks by chunk recorder 406, and saved in storage 408. The size of the chunks is selected to be convenient for processing, such as chunks containing 5 seconds of video/audio. Upon the recording of each chunk, process 210 continues with step 302, items B and C of block 211, in which thumbnail images of the source program are generated, and in which Black Frame index information is generated by thumbnail and indexing block and saved in storage 408. The thumbnail images are used in the editing and marking step described below. As the thumbnail and Black Frame index information is generated for each chunk, the newly generated information may be combined with the thumbnail and Black Frame index information generated for the previous chunks. Alternatively, the thumbnail and Black Frame index information generated for all chunks may be combined after the entire source program is recorded.

In step 303, the recorded chunks are distributed to the plurality of chunk processing subsystems 420. In step 303, item E of block 211, the recorded chunks of the source program are encoded into the desired output format or formats. Encoding block 422 of each subsystem 420 generates the encoded variants (encoded copies of each chunk that vary in the format in which they are encoded), performs frame indexing and stores each encoded variant in the corresponding storage 424 in subsystem 420. As a result, each chunk may be encoded into each format in parallel with the encoding of each other format, and in parallel with the encoding of each format of each other chunk. Examples of typical output formats include MPEG2 SD, MPEG2 HD, MPEG4 SD, MPEG4 HD, H.264 ABR, or H.265, but the present invention contemplates encoding into any output format.

Once thumbnail images for at least some recorded chunks from the source stream become available, the process can begin step 305, item D of block 212, in which a human operator uses operator stream conditioning interface 414, which provides a presentation of the thumbnail images, to determine and mark the actual program start, ad locations, and program ending. Of course, these program features cannot be marked until they are occur in the source stream, but, using steps 301-304, each feature can be marked shortly after they occur in the source stream. Likewise, the program ending can be marked shortly after the end of the program occurs in the source stream. Typically, such program features can be marked within a few seconds of their occurrence in the source stream.

Once a program feature has been marked, the process continues with step 306, item E' of block 213, in which the marked program features are used to re-process only the chunks that are affected. Requests to re-process the affected chunks are sent from operator stream conditioning interface 414 to the chunk marking, editing, and re-encoding block 426 of each chunk processing subsystem 420. For example, those chunks containing the marked program start and ending are edited in block 426 to delete information that is not included in the actual program. Likewise, those chunks containing ad marks are processed in block 426 so that each ad mark is aligned with an I/IDR frame in order to prepare it for Dynamic Advertising. Those chunks that have been modified are then re-encoded in block 426 into the desired output formats. As an example, for a typical source program having a start, an ending, and four commercial breaks, as few as ten chunks may need to be reprocessed.

Process 210 then continues with step 307, item E' of block 213, in which chunk concatenation block 428 of each subsystem 420 concatenates the encoded chunks for each format to form a single media asset per output format for the program. Concatenation is typically a relatively fast process, so step 306 should not add much time to process 210. Once the single media asset has been formed, in step 308, the conventional Quality Control/content verification process, item F of block 214, stream analysis block 430, and the conventional content distribution process, item G of block 215, distribution block 432, are performed.

Figure 5:
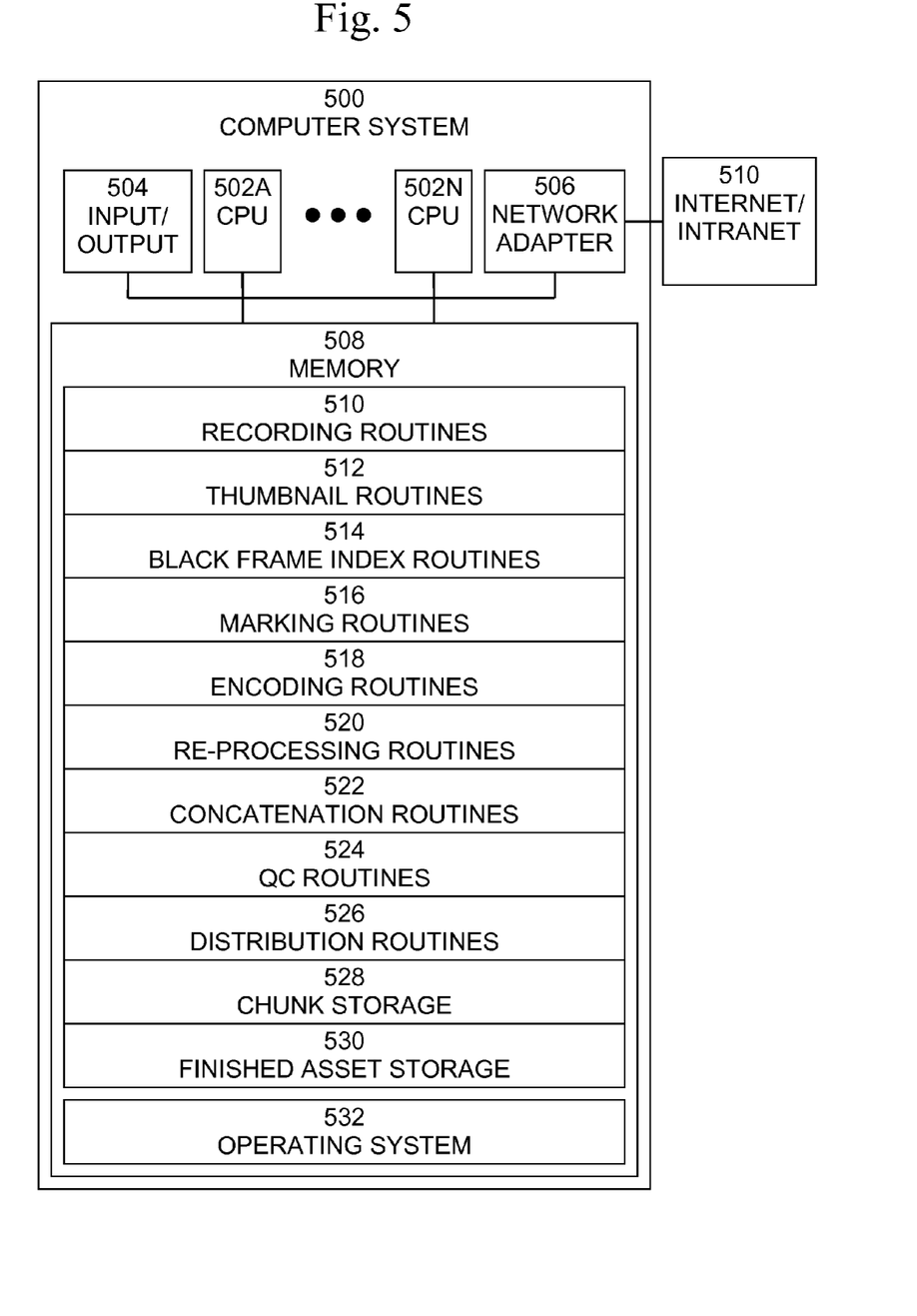
FIG. 5 is an exemplary block diagram of a computer system in which the process shown in FIG. 3 may be implemented.

An exemplary block diagram of a computer system 500, in which the process shown in FIG. 3 may be implemented, is shown in FIG. 5. Computer system 500 is typically a programmed general-purpose computer system, such as a personal computer, workstation, server system, and minicomputer or mainframe computer. Computer system 500 includes one or more processors (CPUs) 502A-502N, input/output circuitry 504, network adapter 506, and memory 508. CPUs 502A-502N execute program instructions in order to carry out the functions of the present invention. Typically, CPUs 502A-502N are one or more microprocessors, such as an INTEL PENTIUM® processor. FIG. 5 illustrates an embodiment in which computer system 500 is implemented as a single multi-processor computer system, in which multiple processors 502A-502N share system resources, such as memory 508, input/output circuitry 504, and network adapter 506. However, the present invention also contemplates embodiments in which computer system 500 is implemented as a plurality of networked computer systems, which may be single-processor computer systems, multi-processor computer systems, or a mix thereof.

Input/output circuitry 504 provides the capability to input data to, or output data from, computer system 500. For example, input/output circuitry may include input devices, such as keyboards, mice, touchpads, trackballs, scanners, etc., output devices, such as video adapters, monitors, printers, etc., and input/output devices, such as, modems, etc. Network adapter 506 interfaces device 500 with a network 510. Network 510 may be any public or proprietary LAN or WAN, including, but not limited to the Internet.

Memory 508 stores program instructions that are executed by, and data that are used and processed by, CPU 502 to perform the functions of computer system 500. Memory 508 may include, for example, electronic memory devices, such as random-access memory (RAM), read-only memory (ROM), programmable read-only memory (PROM), electrically erasable programmable read-only memory (EEPROM), flash memory, etc., and electro-mechanical memory, such as magnetic disk drives, tape drives, optical disk drives, etc., which may use an integrated drive electronics (IDE) interface, or a variation or enhancement thereof, such as enhanced IDE (EIDE) or ultra direct memory access (UDMA), or a small computer system interface (SCSI) based interface, or a variation or enhancement thereof, such as fast-SCSI, wide-SCSI, fast and wide-SCSI, etc., or Serial Advanced Technology Attachment (SATA), or a variation or enhancement thereof, or a fiber channel-arbitrated loop (FC-AL) interface.

The contents of memory 508 varies depending upon the function that computer system 500 is programmed to perform. In the example shown in FIG. 5, memory contents that would be included in a personal computer are shown. However, one of skill in the art would recognize that these functions, along with the memory contents related to those functions, may be included on one system, or may be distributed among a plurality of systems, based on well-known engineering considerations. The present invention contemplates any and all such arrangements.

In the example shown in FIG. 5, memory 508 includes recording routines 510, thumbnail routines 512, Black Frame index routines 514, marking routines 516, encoding routines 518, re-processing routines 520, concatenation routines 522, Quality Control routines 524, distribution routines 526, chunk storage 528, finished asset data storage 530, and operating system 532. Recording routines 510 acquire and record the source program video/audio stream into discrete chunks. Thumbnail routines 512 generate thumbnail images of the source program. Black Frame index routines 514 generate Black Frame index information. Marking routines 516 present the thumbnail images to a human operator and provide the capability for the operator to determine and mark the actual program start, ad locations, and program ending. Encoding routines 518 encode the recorded chunks of the source program into the desired output format or formats. Re-processing routines 520 use the marked program features to re-process affected the chunks and may call encoding routines 518 to re-encode the modified chunks. Concatenation routines 522 concatenate the encoded chunks for each format to form a single media asset for the program. Quality Control routines 524 preform a Quality Control/content verification process. Distribution routines 526 a content distribution process. Chunk storage 528 stores recorded chunks during encoding, thumbnail and Black Frame index information generation, marking, re-processing, and concatenation. Finished asset storage 530 stores the finished assets for distribution. Operating system 532 provides overall system functionality.

As shown in FIG. 5, the present invention contemplates implementation on a system or systems that provide multi-processor, multi-tasking, multi-process, and/or multi-thread computing, as well as implementation on systems that provide only single processor, single thread computing. Multi-processor computing involves performing computing using more than one processor. Multi-tasking computing involves performing computing using more than one operating system task. A task is an operating system concept that refers to the combination of a program being executed and bookkeeping information used by the operating system. Whenever a program is executed, the operating system creates a new task for it. The task is like an envelope for the program in that it identifies the program with a task number and attaches other bookkeeping information to it. Many operating systems, including Linux, UNIX®, OS/2®, and Windows®, are capable of running many tasks at the same time and are called multitasking operating systems. Multi-tasking is the ability of an operating system to execute more than one executable at the same time. Each executable is running in its own address space, meaning that the executables have no way to share any of their memory. This has advantages, because it is impossible for any program to damage the execution of any of the other programs running on the system. However, the programs have no way to exchange any information except through the operating system (or by reading files stored on the file system). Multi-process computing is similar to multi-tasking computing, as the terms task and process are often used interchangeably, although some operating systems make a distinction between the two.

It is important to note that while aspects of the present invention have been described in the context of a fully functioning data processing system, those of ordinary skill in the art will appreciate that the processes of the present invention are capable of being distributed in the form of a computer program product including a computer readable medium of instructions. Examples of non-transitory computer readable media include storage media, examples of which include, but are not limited to, floppy disks, hard disk drives, CD-ROMs, DVD-ROMs, RAM, and, flash memory.

Although specific embodiments of the present invention have been described, it will be understood by those of skill in the art that there are other embodiments that are equivalent to the described embodiments. Accordingly, it is to be understood that the invention is not to be limited by the specific illustrated embodiments, but only by the scope of the appended claims.

What is claimed is:

1. A method of preparing contribution content for distribution processing comprising:
recording a first discrete temporal portion of a video, audio, or video and audio program stream in a first processing segment;
recording a plurality of additional discrete temporal portions of the video, audio, or video and audio program stream in additional processing segments, and during recording of at least one additional processing segment, performing the following:
processing the first processing segment so as to mark at least one location in the first processing segment indicating at least one of information to be deleted before the start of the program, information to be deleted after the end of the program, or at least one event within the program,
in parallel, encoding the first processing segment to a plurality of output formats, and
for each of the plurality of output formats, in parallel, modifying the recorded and encoded processing segments which correspond to locations that have been marked in the program stream and re-encoding the modified processing segments; and
after all the processing segments for the program stream have been recorded, marked, encoded, modified, and re-encoded, for each of the plurality of output formats, concatenating the encoded and re-encoded processing segments to form an output program in each of the plurality of output formats to be further processed for distribution.

2. The method of claim 1, wherein the modifying the recorded and encoded processing segments comprises at least one of deleting information before the indicated start of the program, deleting information after the indicated end of the program, or aligning a mark indicating each event to an I/IDR frame.

3. The method of claim 1, wherein the output format includes at least one of MPEG2 SD, MPEG2 HD, MPEG4 SD, MPEG4 HD, H.264 ABR, H.265.

4. The method of claim 1, wherein the processing the first processing segment so as to mark at least one location comprises:
generating thumbnail images from a proxy representing the first processing segment,
displaying the thumbnail images to a technician, whereupon the technician marks a location using the thumbnail images and inputs the information, and
receiving the input information from the technician indicating at least one of a start of the program, an end of the program, or a location of an event in the program.

5. A system for preparing content for distribution comprising:
a processor operable to execute computer program instructions;
a memory operable to store computer program instructions executable by the processor; and
computer program instructions stored in the memory and executable to:
recording a first discrete temporal portion of a video, audio, or video and audio program stream in a first processing segment;
recording a plurality of additional discrete temporal portions of the video, audio, or video and audio program stream in additional processing segments, and during recording of at least one additional processing segment, performing the following:
processing the first processing segment so as to mark at least one location in the first processing segment indicating at least one of information to be deleted before the start of the program, information to be deleted after the end of the program, or at least one event within the program,
in parallel, encode each recorded chunk to a plurality of output formats, wherein the encoding is started after at least one chunk is recorded but before all chunks of the program are recorded;
in parallel, encoding the first processing segment to a plurality of output formats, and
for each of the plurality of output formats, in parallel, modifying the recorded and encoded processing segments which correspond to locations that have been marked in the program stream and re-encoding the modified processing segments; and
after all the processing segments for the program stream have been recorded, marked, encoded, modified, and re-encoded, for each of the plurality of output formats, concatenating the encoded and re-encoded processing segments to form an output program in each of the plurality of output formats to be further processed for distribution.

6. The system of claim 5, wherein the modifying the recorded and encoded processing segments comprises at least one of deleting information before the indicated start of the program, deleting information after the indicated end of the program, or aligning a mark indicating each event to an I/IDR frame.

7. The system of claim 5, wherein the output format includes at least one of MPEG2 SD, MPEG2 HD, MPEG4 SD, MPEG4 HD, H.264 ABR, or H.265.

8. The system of claim 5, wherein the processing the first processing segment so as to mark at least one location comprises:
generating thumbnail images from a proxy representing the first processing segment,
displaying the thumbnail images to a technician, whereupon the technician marks a location using the thumbnail images and inputs the information, and
receiving the input information from the technician indicating at least one of a start of the program, an end of the program, or a location of an event in the program.

9. A computer program product comprising a non-transitory computer readable medium storing computer program instructions for:
recording a first discrete temporal portion of a video, audio, or video and audio program stream in a first processing segment;
recording a plurality of additional discrete temporal portions of the video, audio, or video and audio program stream in additional processing segments, and during recording of at least one additional processing segment, performing the following:
processing the first processing segment so as to mark at least one location in the first processing segment indicating at least one of information to be deleted before the start of the program, information to be deleted after the end of the program, or at least one event within the program, in parallel, encoding the first processing segment to a plurality of output formats, and for each of the plurality of output formats, in parallel, modifying the recorded and encoded processing segments which correspond to locations that have been marked in the program stream and re-encoding the modified processing segments; and after all the processing segments for the program stream have been recorded, marked, encoded, modified, and re-encoded, for each of the plurality of output formats, concatenating the encoded and re-encoded processing segments to form an output program in each of the plurality of output formats to be further processed for distribution.

10. The computer program product of claim 9, wherein the modifying the recorded and encoded processing segments comprises at least one of deleting information before the indicated start of the program, deleting information after the indicated end of the program, or aligning a mark indicating each event to an I/IDR frame.

11. The computer program product of claim 9, wherein the output format includes at least one of MPEG2 SD, MPEG2 HD, MPEG4 SD, MPEG4 HD, H.264 ABR, or H.265.

12. The computer program product of claim 9, wherein the processing the first processing segment so as to mark at least one location comprises:

generating thumbnail images from a proxy representing the first processing segment, displaying the thumbnail images to a technician, whereupon the technician marks a location using the thumbnail images and inputs the information, and receiving the input information from the technician indicating at least one of a start of the program, an end of the program, or a location of an event in the program.

13. A system for preparing content for distribution comprising:

a processing system comprising a processor, memory, and computer program instructions configured to:

record a first discrete temporal portion of a video, audio, or video and audio program stream in a first processing segment, record a plurality of additional discrete temporal portions of the video, audio, or video and audio program stream in additional processing segments, and during recording of at least one additional processing segment, performing the following:

distribute the first processing segment to a chunk processing subsystem, and transmit requests to each of the plurality of chunk processing subsystems based on technician input indicating at least one location that has been marked in the first processing segment, wherein the first processing segment has been processed so as to mark at least one location in the first processing segment indicating information to be deleted before the start of the program, information to be deleted after the end of the program, or at least one event within the program; and a plurality of chunk processing subsystems, each chunk processing subsystem comprising a processor, memory, and computer program instructions configured to:

in parallel with the other chunk processing subsystems, encode the first processing segment to a plurality of output formats, modifying the recorded and encoded processing segments in which locations have been marked and re-encoding the modified processing segments, in response to receiving the requests from the processing system indicating locations that have been marked in at least some of the recorded processing segments, and after all the processing segments for the program stream have been recorded, marked, encoded, modified, and re-encoded, for each of the plurality of output formats, concatenating the encoded and re-encoded processing segments to form an output program in each of the plurality of output formats to be further processed for distribution.

14. The method of claim 13, wherein the modifying the recorded and encoded processing segments comprises at least one of deleting information before the indicated start of the program, deleting information after the indicated end of the program, or aligning a mark indicating each event to an I/IDR frame.

15. The method of claim 13, wherein the output format includes at least one of MPEG2 SD, MPEG2 HD, MPEG4 SD, MPEG4 HD, H.264 ABR, H.265.

16. The system of claim 13, wherein the processing the first processing segment so as to mark at least one location comprises:

generating thumbnail images from a proxy representing the first processing segment, displaying the thumbnail images to a technician, whereupon the technician marks a location using the thumbnail images and inputs the information, and receiving the input information from the technician indicating at least one of a start of the program, an end of the program, or a location of an event in the program.

* * * * *